United States Patent [19]

Kent

[11] Patent Number: 4,470,612

[45] Date of Patent: Sep. 11, 1984

[54] DRIVE AND SUSPENSION ARRANGEMENT

[75] Inventor: Godfrey S. Kent, Woodstock, Canada

[73] Assignee: Eaton Yale Ltd., Woodstock, Canada

[21] Appl. No.: 449,087

[22] Filed: Dec. 13, 1982

[51] Int. Cl.³ .......................................... B60K 17/32
[52] U.S. Cl. ................................................. 280/111
[58] Field of Search ......................... 280/111, 112 R; 180/235

[56] References Cited

U.S. PATENT DOCUMENTS

| | | | |
|---|---|---|---|
| 2,602,518 | 7/1952 | Beck | 280/111 |
| 3,157,242 | 11/1964 | Kozicki | 280/112 R |
| 3,167,147 | 1/1965 | Symons et al. | 180/235 |
| 3,844,370 | 10/1974 | Belkovicz et al. | 280/111 |

FOREIGN PATENT DOCUMENTS 310794  7/1929  United Kingdom ........... 280/112 R

Primary Examiner—Joseph F. Peters, Jr.
Assistant Examiner—D. Lynn Fugate
Attorney, Agent, or Firm—C. H. Grace; C. J. Toddy

[57] ABSTRACT

An axle beam asembly (33) for an articulated vehicle (10). The beam assembly receives a drive axle (42) of the vehicle and is mounted on a frame (28) of the vehicle for rotation about a horizontal axis (30) which is laterally offset from the longitudinal centerline (37) of the vehicle. The vehicle includes a transfer case (63) having a driveshaft (48) extending therefrom to the drive axle through a hole (46) formed in the beam assembly on an axis substantially coincident with the longitudinal centerline of the vehicle.

4 Claims, 6 Drawing Figures

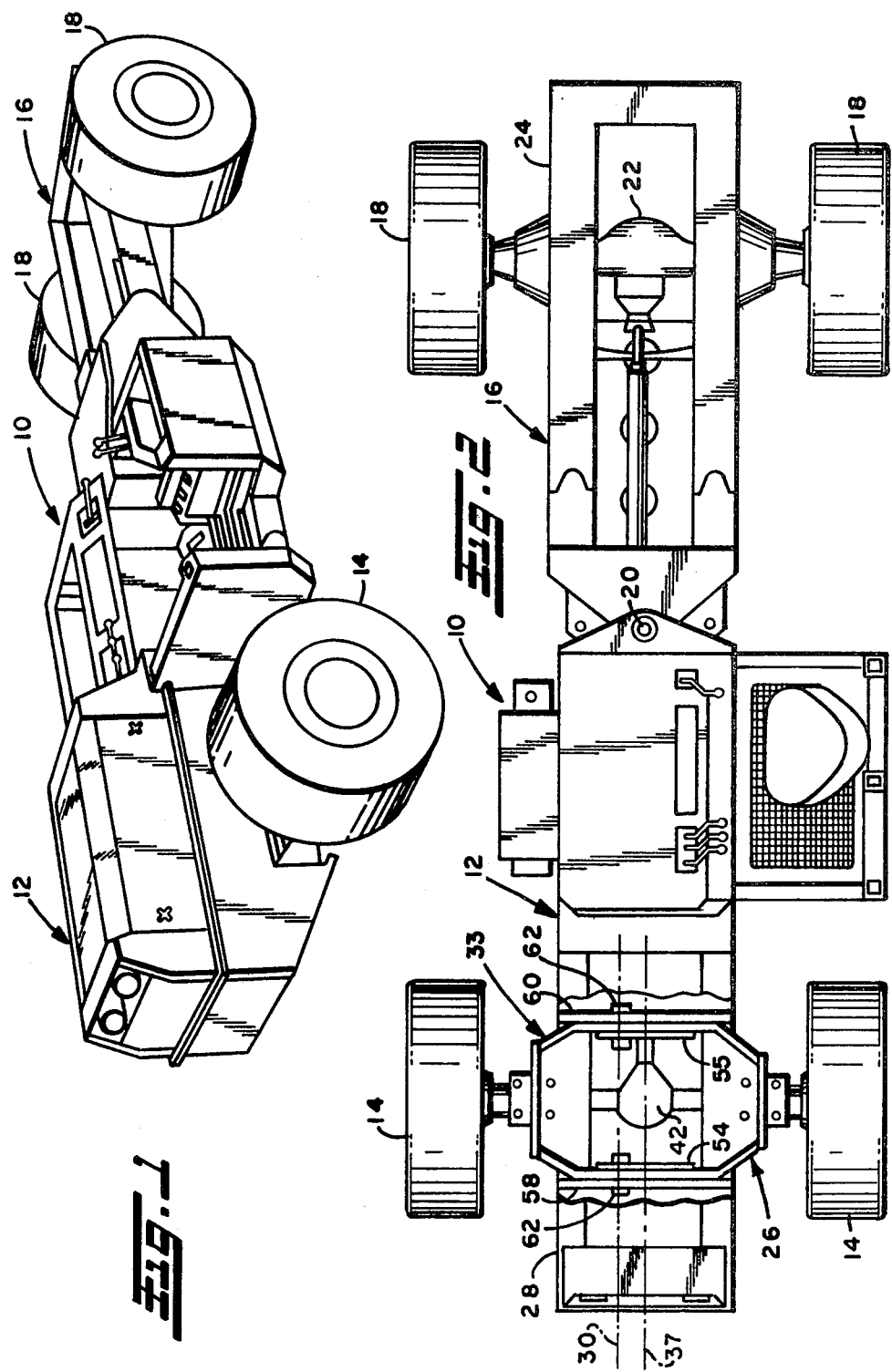

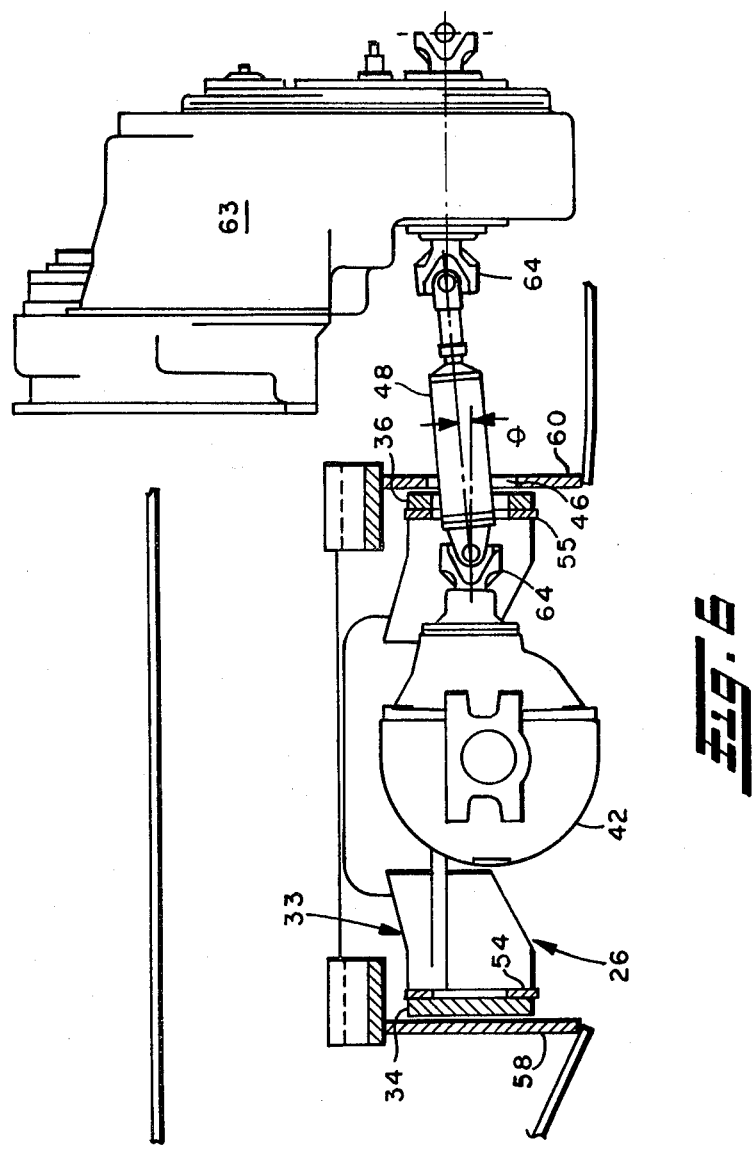

DRIVE AND SUSPENSION ARRANGEMENT

The present invention relates generally to a drive and suspension arrangement for an off-highway vehicle, and, more particularly, to a walking beam type drive and suspension system for an articulated vehicle.

In the construction of articulated off-highway vehicles, it is common practice to mount at least one of the drive axles on a frame structure which pivots about an axis parallel to the longitudinal axis of the vehicle. As shown in United States Pat. No. 3,167,147, the prior art practice is to mount the pivot frame with its pivot axis parallel to the longitudinal axis of the vehicle, with the vehicle driveshaft running below the pivot frame, the frame being angled upwardly at its center to clear the driveshaft.

While the above structure is adequate for many applications, for vehicles which operate over extremely rough terrain the axle position beneath the pivot frame puts the drive axle and associated drive line components in a very vulnerable position. Also, this axle position requires relatively high driveshaft operating angles, which can result in excessive wear. Also, the prior art arrangement is not suitable for operation in a low headroom environment, such as in a mine.

It is the object of the present invention to provide a drive and suspension arrangement for a vehicle having an extremely low profile suitable for mining operations, and it is a further object to provide such an arrangement which also provides maximum protection for the drive line components, while minimizing the operating angles of the drive shafts associated therewith.

To meet the above objectives, the present invention provides a pivot frame or beam assembly to which the axle is mounted. The axle housing is received in the center of the beam assembly with a centrally disposed opening formed in the beam assembly through which the driveshaft of the drive train passes. The beam assembly pivots about an axis which is offset from the centerline of the vehicle. This structure allows the drive train of the vehicle to be mounted very low, thus maintaining a low profile, while the beam assembly at least partially surrounds the drive and transfer shaft to provide maximum protection therefor. The mounting of the axle within the beam assembly rather than beneath it also minimizes the operating angle of the drive shaft.

Other objects and advantages of the invention will be apparent from the following description when considered in connection with the accompanying drawings, wherein:

FIG. 1 is a perspective view of a vehicle incorporating the invention;

FIG. 2 is a plan view of the vehicle shown in FIG. 1 with parts cut away;

Figure 3:
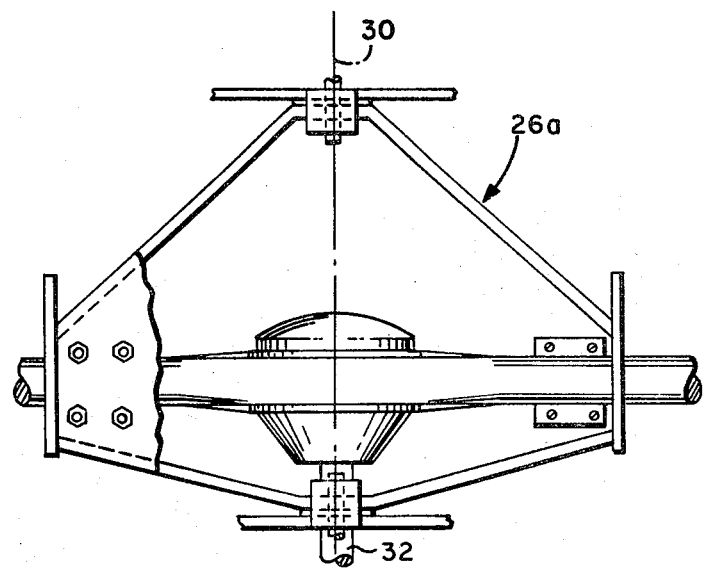
FIG. 3 is a plan view of a prior art structure.

Referring to FIGS. 1 and 2 there is illustrated a vehicle, designated generally by the numeral 10, which is particularly suited for transporting material and personnel in a low headroom environment, such as in a mine.

The vehicle 10 comprises a forward section 12 supported by front drive wheels 14, a rear section 16 supported by rear drive wheels 18, and a central pivot connection 20, which provides articulation of the front and rear sections about a vertical axis.

The rear drive wheels 18 are mounted for rotation on a rear axle assembly 22 which is rigidly mounted on a frame 24 of the rear section 16. The front wheels 14 are mounted for rotation on a front axle assembly 26 which is mounted on the frame 28 of front section 12 for pivotal movement about a horizontal axis 30 as shown in FIG. 2.

Figure 4:
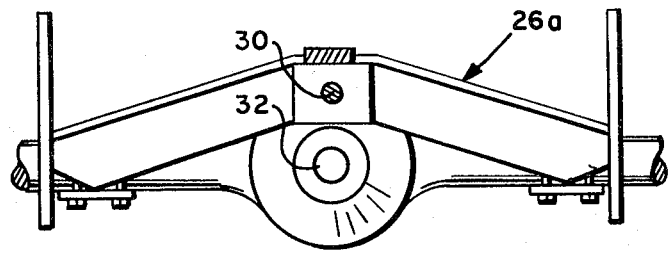
FIG. 4 is an end elevational view of the prior art structure shown in FIG. 3.

FIGS. 3 and 4 illustrate a typical prior art front axle assembly 26a in which the horizontal pivot axis 30 and the axis of rotation of a front drive shaft 32 of the axle assembly are located in the same vertical plane extending through the longitudinal centerline of the vehicle 10. With the pivot axis 30 and the drive shaft axis located in the same plane, the prior art arrangement requires that the axle assembly be arched upwardly at the center as shown in FIG. 4, resulting in a front frame structure which is inherently unsuitable for a low headroom application. Also, the necessary vertical spacing between the pivot axis and the driveshaft results in severe driveline angles which can cause undue stress and wear in the driveline components.

Figure 5:
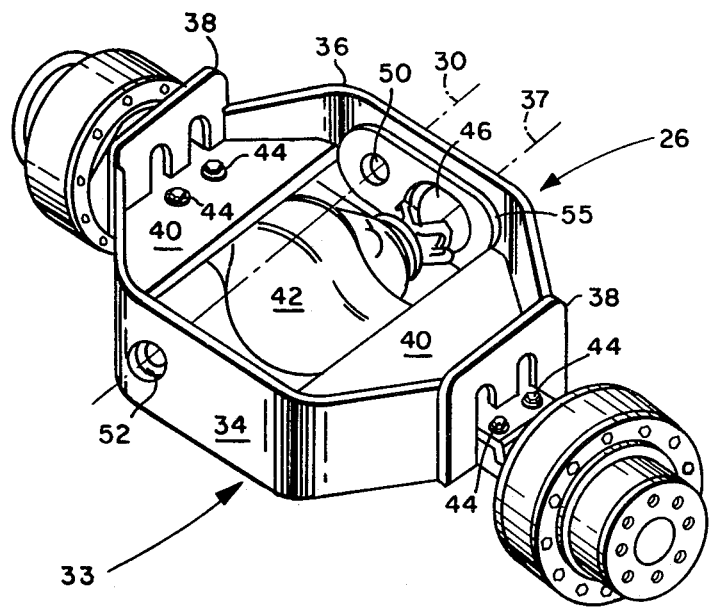
FIG. 5 is a perspective view of an axle assembly constructed in accordance with the invention; and, FIG. 6 is a partial, longitudinal sectional view of the vehicle shown in FIG. 1.

Referring particularly to FIGS. 2 and 5, there is illustrated a front axle assembly 26, which effectively eliminates the above problem associated with the prior art axle arrangements. The front axle assembly 26 comprises a frame assembly 33 including a front frame plate 34 and a rear frame plate 36, both of which are formed as shallow U-shaped members as seen in plan view in FIG. 2, end plates 38 welded to the front and rear plates, and top plates 40 which are welded to the front and rear plates; and a drive axle 42 which is bolted or otherwise fastened to the top plates 40.

The end plates 38 are each formed in the shape of the letter "M", with end portions of the top plates received between the outer legs thereof. In the embodiment illustrated herein, the drive axle 42 is attached to the top plates adjacent each of the end plates by means of four bolts 44, with two bolts located outside the end plate and two bolts inside.

In accordance with the invention, the drive axle 42 is centrally disposed within the frame assembly 33, and a first hole 46 is formed in the rear frame plate 36 on the vehicle centerline 37 to receive a drive shaft 48. A second hole 50 is formed in the rear frame plate on offset pivot axis 30 and a corresponding hole 52 is formed in frame plate 34. As shown in FIGS. 2 and 5, reinforcing plates 54 and 55 are welded or otherwise fastened to the front and rear frame plates in the area of the holes 46, 50 and 52.

As illustrated in FIG. 2, the axle assembly 26 is pivotally mounted on the vehicle between first and second transverse frame members 58 and 60 attached to the main frame of the vehicle by means of pivot pins 62 received through the holes 52 in a conventional manner.

As discussed in the introductory portion of this specification, prior art practice is to pivot the axle assembly 26 about the centerline 37; however, it has been found that in the off-highway, heavy duty application for which the vehicle 10 is intended, the fact that the pivot axis 30 is offset from the centerline has no adverse effect on the performance of the vehicle.

FIG. 6 illustrates one of the principal advantages of the offset pivot arrangement of the invention. Since the pivot axis 30 does not have to be disposed above the axis 37 as is the case in the prior art structures of FIGS. 3 and 4, the entire chassis structure of the front section 12 of the vehicle can be very low, with the drive components such as the engine (not shown) and the gear box and transfer case 63 mounted very low in the vehicle frame. Accordingly, the drive shaft 48 which connects the drive axle 42 and the gear box and transfer case 67 through universal joints 64 is disposed at a very small angle O, which signficantly improves the smoothness and durability of the vehicle drive train.

I claim:

1. In an articulated vehicle comprising a pair of frames pivotally connected together about a generally vertical axis, an axle beam assembly pivotally mounted on a first of said frames about a horizontal axis parallel to the longitudinal centerline of the vehicle, a first drive axle mounted on said beam assembly, a second drive axle mounted on the second of said frames, a drive transfer mechanism mounted on one of said frames, and a drive shaft extending from said drive transfer mechanism to said first drive axle; the improvement wherein said horizontal axis is offset laterally from the longitudinal centerline of said vehicle and said drive shaft extends through a hole formed in said axle beam assembly on an axis substantially in the same verticle plane as the longitudinal center line of the vehicle.

2. Apparatus as claimed in claim 1, in which said beam assembly comprises first and second frame plates spaced apart along said horizontal axis, and the hole through which said drive shaft extends is formed in one of said frame plates.

3. Apparatus as claimed in claim 2 in which said frame plates are joined by first and second end plates and said beam assembly further includes first and second horizontal plates attached to said frame plates and to said end plates, said drive axle being attached to said horizontal plates.

4. In an articulated vehicle comprising a pair of frames pivotally connected together about a generally verticle axis, an axle beam assembly including first and second frame plates vertically disposed and spaced apart longitudinally of the centerline of the vehicle, a drive axle mounted on said beam assembly between said verticle plates, a drive shaft extending from said drive axle through a hole formed in one of said verticle frame plates, a pair of pivot pins extending through said verticle plates and forming a horizontal axis parallel to the longitudinal center line of the vehicle but laterally offset from the longitudinal centerline of said vehicle, said axle beam assembly mounted on said pins for pivotable movement about said horizontally offset axis.

* * * * *